United States Patent
Boss et al.

(10) Patent No.: US 10,289,190 B2
(45) Date of Patent: May 14, 2019

(54) POWER MANAGEMENT AND PRIORITY CHARGING ASSIGNMENTS

(71) Applicant: INTERNATIONAL BUSINESS MACHINES CORPORATION, Armonk, NY (US)

(72) Inventors: Gregory J. Boss, Saginaw, MI (US); Andrew R. Jones, Round Rock, TX (US); P. Daniel Kangas, Raleigh, NC (US); Kevin C. McConnell, Austin, TX (US); John E. Moore, Jr., Brownsburg, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 108 days.

(21) Appl. No.: 15/462,974

(22) Filed: Mar. 20, 2017

(65) Prior Publication Data
US 2017/0192483 A1      Jul. 6, 2017

Related U.S. Application Data

(63) Continuation of application No. 12/825,859, filed on Jun. 29, 2010, now Pat. No. 9,692,259.

(51) Int. Cl.
*G06F 1/32*     (2006.01)
*G06F 1/329*    (2019.01)
(Continued)

(52) U.S. Cl.
CPC ............ *G06F 1/329* (2013.01); *G06F 1/3209* (2013.01); *H02J 3/14* (2013.01); *H02J 13/00* (2013.01);
(Continued)

(58) Field of Classification Search
CPC .......... G06F 1/329; G06F 1/3209; H02J 3/14; H02J 13/00; H02J 13/0062; Y02B 70/3225
See application file for complete search history.

(56) References Cited

U.S. PATENT DOCUMENTS

| | | |
|---|---|---|
| 5,045,769 A | 9/1991 | Everett, Jr. |
| 5,483,656 A | 1/1996 | Oprescu et al. |
| (Continued) | | |

FOREIGN PATENT DOCUMENTS

| | | |
|---|---|---|
| GB | 2457506 | 2/2008 |
| JP | 7212985 | 8/1995 |

OTHER PUBLICATIONS

Susanne Albers, Energy-Efficient Algorithms, 1998, Dagstuhl Publishing, p. 1.

*Primary Examiner* — Austin Hicks
(74) *Attorney, Agent, or Firm* — Brian M. Restauro; Andrew M. Calderon; Roberts Mlotkowski Safran Cole & Calderon, P.C.

(57) ABSTRACT

Systems and methods are provided for managing power to devices in a network, using a centralized power allocation controller. The method of managing power consumption of a plurality of devices includes receiving scheduled upcoming calendar events and/or activities from one or more of a plurality of devices connected in a network. The method further includes centrally managing power consumption of a device of the plurality of devices in the network based on the scheduled upcoming calendar events and/or activities.

20 Claims, 3 Drawing Sheets

(51) Int. Cl.
*G06F 1/3209* (2019.01)
*H02J 3/14* (2006.01)
*H02J 13/00* (2006.01)

(52) U.S. Cl.
CPC ....... *H02J 13/0062* (2013.01); *Y02B 70/3225* (2013.01); *Y02P 80/11* (2015.11); *Y04S 20/222* (2013.01)

(56) References Cited

U.S. PATENT DOCUMENTS

| | | | |
|---|---|---|---|
| 5,621,458 A | 4/1997 | Mann et al. | |
| 6,100,670 A | 8/2000 | Levesque | |
| 6,160,376 A | 12/2000 | Kumar et al. | |
| 6,331,761 B1 | 12/2001 | Kumar et al. | |
| 7,100,062 B2 | 8/2006 | Nicholas | |
| 7,415,623 B2 | 8/2008 | Rapps et al. | |
| 8,281,159 B1 | 10/2012 | Cooley et al. | |
| 2002/0016729 A1* | 2/2002 | Breitenbach | G06Q 10/06 707/802 |
| 2002/0119788 A1 | 8/2002 | Parupudi et al. | |
| 2003/0120959 A1 | 6/2003 | Bohrer et al. | |
| 2005/0049729 A1 | 3/2005 | Culbert et al. | |
| 2005/0200332 A1 | 9/2005 | Kangas et al. | |
| 2005/0275372 A1 | 12/2005 | Crowell | |
| 2008/0114499 A1 | 5/2008 | Hakim et al. | |
| 2008/0167088 A1 | 7/2008 | Rabu et al. | |
| 2009/0160401 A1 | 6/2009 | Dishman et al. | |
| 2009/0187780 A1 | 7/2009 | Keohane et al. | |
| 2009/0243552 A1 | 10/2009 | Jakes et al. | |
| 2009/0307512 A1 | 12/2009 | Munjal | |
| 2010/0063756 A1 | 3/2010 | Agrawal | |
| 2010/0070091 A1 | 3/2010 | Watson et al. | |
| 2010/0123436 A1 | 5/2010 | Herrod et al. | |
| 2011/0130885 A1 | 6/2011 | Bowen et al. | |
| 2011/0264931 A1 | 10/2011 | Chang et al. | |
| 2011/0282527 A1 | 11/2011 | Inbarajan et al. | |
| 2011/0320832 A1 | 12/2011 | Boss et al. | |

* cited by examiner

POWER MANAGEMENT AND PRIORITY CHARGING ASSIGNMENTS

TECHNICAL FIELD

The invention is directed to power management systems and, more particularly, to systems and methods for power management and priority charging assignments based on monitoring of electronic calendars.

BACKGROUND

Mobile computing devices such as laptop computers, portable digital assistants (PDAs), etc. are commonly used in business to increase worker productivity, increase communications capabilities and generally increase overall worker efficiency. These same types of devices are also used by many people for personal use such as to download information from the Internet. Importantly, these mobile computing devices are powered on batteries, which are recharged by A/C adapter power supplies.

It is not uncommon to use the internal power source, e.g., battery, of the device, whether it is for business or personal use. However, batteries in mobile computing devices have limited capacity (time) and have to be recharged periodically or they will power down unexpectedly which, in turn, can lead to loss of information. To recharge the battery, it is necessary for the user to plug the device into an A/C power source. These devices, though, begin to consume electricity with other devices on the electrical grid, such as computers, servers, appliances, etc. This places a drain on the grid, and may not use electricity in the most efficient manner. For example, the mobile devices may be plugged into the electric outlet during peak usage times, resulting in the batteries being charged at the highest possible costs (when they could have been charged at another time).

SUMMARY

In a first aspect of the invention, a method of managing power consumption of a plurality of devices comprises receiving scheduled upcoming calendar events and/or activities from one or more devices connected in a network. The method further comprises managing power consumption of the one or more devices in the network based on the scheduled upcoming calendar events and/or activities.

In another aspect of the invention, a system of delivering power to devices comprises a central power allocation controller comprising at least hardware and software components. The central power allocation controller receives calendar information from an electronic calendar of one or more devices in a network and, based on the received calendar information, remotely manages power consumption of the devices in the network.

In still another aspect of the invention, a computer system for managing power consumption in a network. The system comprises a processor, a computer readable memory and a computer readable storage media. First program instructions receive scheduled calendar events and/or activities from a plurality of devices on a network. Second program instructions manage power settings of the one or more devices based on the scheduled calendar events and/or activities. Third program instructions associate priorities and weighting factors to rules associated with the scheduled calendar events and/or activities. The first, second and third program instructions are stored on the computer readable storage media for execution by the processor via the computer readable memory.

In yet another aspect of the invention, a computer program product for managing power in a network. The computer program product comprises a computer readable storage media. First program instructions receive scheduled calendar events and/or activities from a plurality of devices on a network. Second program instructions manage power settings of the one or more devices based on the scheduled calendar events and/or activities. The first and second program instructions are stored on the computer readable storage media.

In still another aspect of the invention, a method is provided for deploying a system of delivering a power supply to a plurality of portable computing devices. The method comprises providing a computer infrastructure operable to: receive scheduled upcoming calendar events and/or activities from one or more devices connected in a network; and manage power consumption of the one or more devices in the network based on the scheduled upcoming calendar events and/or activities.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention is directed to power management systems and, more particularly, to systems and methods for power management and priority charging assignments based on monitoring of electronic calendars. Advantageously, the embodiments of the present invention provide a centralized control to level or balance power usage across an enterprise. The intelligent power delivery can be based on, for example, activities and/or events provided in the users' electronic calendar. The embodiments of the present invention also increase user productivity by eliminating uncharged mobile devices and concern for finding a power source, as well as increase ease of use for mobile device users by eliminating external power adapters. Additionally, embodiments of the present invention can save considerable energy costs by supplying power to devices when power rates are the lowest, and provide the ability to determine current and future power requirements via a communication channel for devices in a shared charging environment influenced by user needs and priority factors, in addition to balancing the available power with business demands, and rules to achieve the most favorable outcome for the business.

In embodiments, a power allocation controller (PAC) controls charging characteristics of devices based on, for example, events and/or actions provided in an electronic calendar of the user's devices. The power allocation controller can also manage power based on rules and/or priorities and/or user requests. In embodiments, the systems and methods of the present invention can provide weighting factors for certain activities/events and/or priorities and/or rules and/or user requests. The power allocation controller can provide power management across an entire enterprise or within a certain location such as, for example, within a building, on a floor of the building, within a certain location within a building, etc. Several methods dictating the communication, identification and authorization of charging rights of the network are contemplated by the present invention.

By way of illustrative example, devices can have their power allocation remotely controlled by the power allocation controller based on scheduled activities/events obtained from their electronic calendar. For example, charging of batteries of certain mobile devices can be monitored and controlled by the power allocation controller, based on present and upcoming events scheduled in an electronic calendar, in order to ensure that, for example, a battery of one or more devices is properly charged prior to a long trip in which electrical power may not be available (e.g., train or airplane). In further embodiments, the power allocation controller can control power delivery based on type or users of the device (e.g., priority devices), time of day usage (e.g., charge batteries prior to a meeting based on a calendar event), in combination with the scheduled activities/events.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
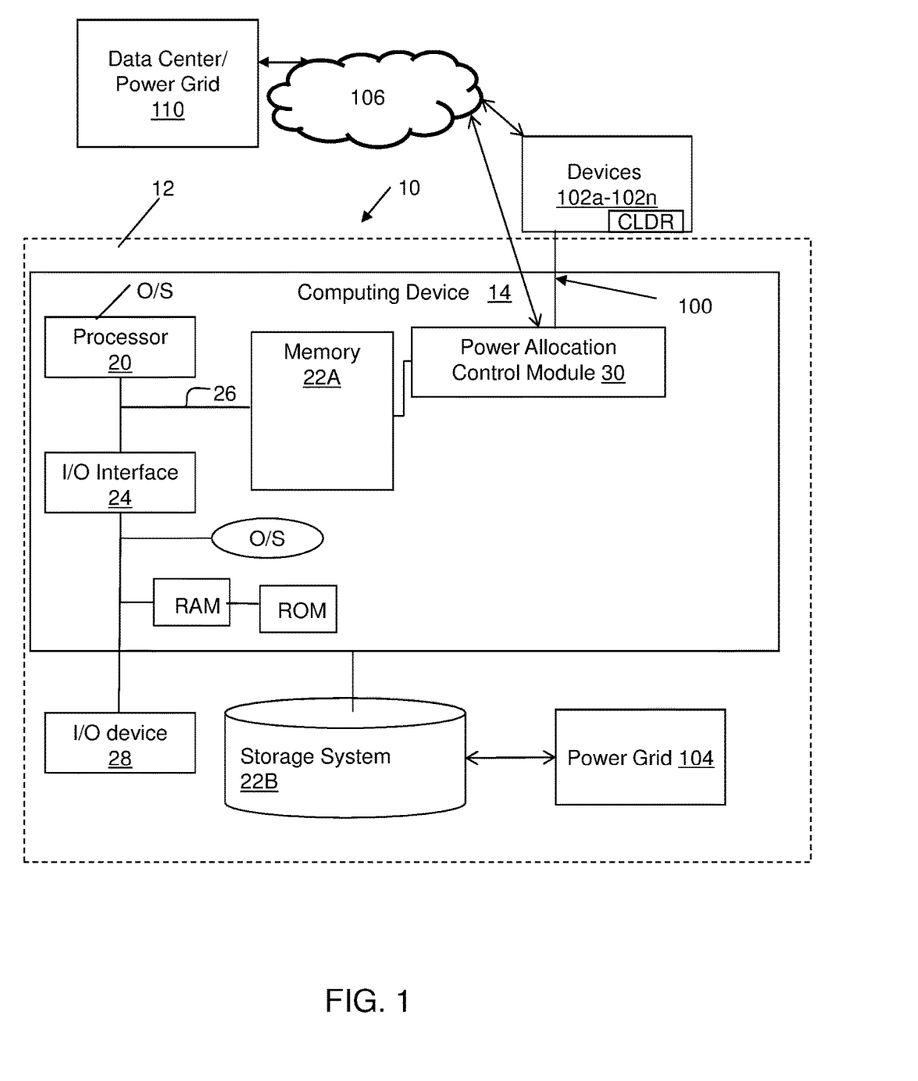
FIG. 1 shows an illustrative environment for implementing the systems and methods in accordance with aspects of the invention.

FIG. 1 shows an illustrative system that can implement the processes of the invention. For example, a power allocation controller 10 includes a power allocation control module 30 for managing the processes in accordance with the invention. To this extent, the power allocation control module 30 (and/or power allocation controller 10) is operable to identify, discover, and balance power consumption to devices 102*a*-102*n* in a network 106, e.g., process described herein. The network of devices 102*a*-102*n*, can include, for example, any type of computing device such as laptops and other mobile devices that are capable of communicating over a network with the power allocation controller 10. The computing devices can also be other devices in which power consumption can be managed by the power allocation controller, e.g., printers, gaming consoles, etc.

The power allocation control module 30 (and/or power allocation controller 10) is connected to the devices 102a-102n by communications channel 100 as discussed in more detail below. In embodiments, the power allocation control module 30 (and/or power allocation controller 10) receives activities/events from each of the devices 102a-102n, stored in an electronic calendar "CLDR" of each of the devices 102a-102n. These activities/events can be polled periodically by the power allocation control module 30 (and/or power allocation controller 10) or pushed directly from the devices 102a-102n.

In embodiments, the power allocation control module 30 (and/or power allocation controller 10) receives activities/events from one or more of the devices, stored in an electronic calendar "CLDR" of each of the devices 102a-102n, and centrally manages power consumption of another device of a plurality of devices in the network based on the scheduled upcoming calendar events and/or activities. In this way, the receiving of a calendar event can be from one computing device, and the managing of power consumption can be provided on another (second) device, which is different than the first device.

In embodiments, the power allocation control module 30 (and/or power allocation controller 10) is connected to a database 22B, which may be internal or external. The database 22B may include a look up table to determine charging priorities and/or rules for each of the devices 102a-102n, based on the events/activities scheduled in the respective calendars (which can be provided through the power allocation control module 30 or devices themselves). The database 22B may also include power grid information (peak usage times, cost of electricity for current and future times of the day, etc.), and other device information. The device information can include, for example, BIOS information, the type of device, battery charging requirements, registry information, hardware configuration, software configuration, sleep mode requirements, current or historic usage of the device, location information and other information that may be needed in order to balance or manage the power consumption of the devices 102a-102n. This and other information can be polled periodically by the power allocation controller 10.

Rules can be provided to the power allocation control module 30 (and/or power allocation controller 10) and, based on events/activities in the devices' electronic calendar, actions can be appropriately taken by the power allocation control module 30 (and/or power allocation controller 10). By way of non-limiting examples, some rules may include, but are not limited to, in any combination:

If conference call taken on smart phone over cell voice network, charge the smart phone prior to a laptop that does not need charging.

If conference is being held on conference room speakerphone, then do not charge device (and allow other priority devices to be charged).

If conference is on Voice Over IP using a laptop, then charge the laptop prior to call.

If meeting is a customer meeting, then charge the laptop or other appropriate device prior to meeting.

If meeting is revenue generating, then charge the laptop or other appropriate device prior to meeting.

Is user is driving during a certain time slot that a conference call is scheduled, then charge the laptop or other device prior to the drive.

If user will not be using the laptop, but may be on conference call on smart phone, then charge the smart phone and not laptop prior to meeting.

If user is a passenger in an automobile, then charge the laptop or other appropriate device so that the passenger can use the device during travel.

If a meeting has Do Not Disturb option enabled (no email, no phone calls) (used in face to face meetings), then the laptop or other appropriate device may be powered down to improve charging time.

In further embodiments, the power allocation control module 30 (and/or power allocation controller 10) can collect information from the devices on the network and proactively take action. These actions, for example, can be stored in the database 22B. By way of non-limiting examples, alone or in any combination:

Monitor (and/or read) all user calendars and proactively take power management actions, depending on the upcoming events. For example, the power allocation controller 10 can read devices' calendars and know the power requirements for future meetings.

Update devices' calendars if there are power appliances available at certain locations in which the device will be located, and discovered by the power allocation controller 10. For example, the power allocation control module 30 (and/or power allocation controller 10) can update the devices' calendars with power availability in airports, airplanes or other transportation terminals and modes of transportation by communicating with airport facilities and airline web sites. In this way, the user and/or the power allocation control module 30 (and/or power allocation controller 10) can determine whether it is necessary to charge a battery of a device, for example, prior to any travel.

Determine how many participants are attending a meeting and their power requirements. If the power requirements exceed the capacity, the system may reschedule the meeting to a facility that meets the requirements or provide a charge to the device prior to the meeting. This can be done by having power requirement information of other meeting places in the database.

If any devices are connected to other devices and/or require power for computational intensive computing needs (e.g., connected to a projector or performing high computational work that requires power), then the battery should be charged. The power allocation control module 30 (and/or power allocation controller 10) can receive such information from the computing device, itself, through the logic of the computing device.

In still further embodiments, the power allocation control module 30 (and/or power allocation controller 10) can collect requests from the devices (or other sources such as, for example, a service provider, management, etc.) on the network and proactively take action. The requests can, for example, be stored in the database 22B. These requests may be, for example, user real time on demand requests to adjust power management. These requests may be provided on a priority basis such as, for example, An employee having critical job responsibilities for a company can be provided with a charge to his/her device prior to another employee having less critical responsibilities. Similarly, an employee that is about to enter a revenue generating meeting may be provided with priority over another employee that merely wants his/her devices to be fully charged. By way of non-limiting examples, alone or in any combination:

- User can request a priority charge to charge battery 100% based on upcoming travel.
- User can request a best effort charge, e.g., the power allocation controller may only allocate "x" amount of power to the device \based on system load and energy cost.
- User can acknowledge that there are no other power sources and hence, requires a battery charge prior to leaving current location.
- User can define the time they must disconnect from power appliance and hence require a battery charge prior to such time.
- User can specify if computing device is required to perform meeting function (e.g., computing device is required to project screens for meeting) and hence require a battery charge and/or power during a presentation.

In still further embodiments, the power allocation control module 30 (and/or power allocation controller 10) can use other factors to influence power supply to a device. The factors can, for example, be stored in the database 22B. By way of non-limiting examples, alone or in any combination:

- Present physical location of the device across an enterprise (e.g., in a certain site location, certain building number, certain conference room or laboratory). In these cases, the power allocation control module 30 (and/or power allocation controller 10) can turn off certain components of the device depending on the location of the device, i.e., the power allocation controller may automatically turn off GPS radio on a smart phone to improve charging time.
- Obtain information from corporate directory to obtain corporate or functional hierarchy of the owner of the device in order to make a determination as to charging priorities, (e.g., Security or Emergency services, critical projects based on dead lines, etc.) etc.

The database 22B may also receive information from the power grid 104, which includes peak power usages, energy costs for certain times of the day and other power management information. More specifically, the power allocation control module 30 (and/or power allocation controller 10) may be tied to a power company charging system 110 that influences delivered power at the most cost effective times. The power allocation control module 30 (and/or power allocation controller 10) may also be tied into a data center energy management system (also denoted by reference numeral 110) that sends out a reduction signal to all conference rooms and employee offices to divert power to the most critical systems in the event of a power failure or reduction in available power. All or a combination of this information can be used by the power allocation control module 30 (and/or power allocation controller 10) to make power consumption decisions for each of the devices 102a-102n.

In embodiments, the connected devices 102a-102n can transmit their requests and/or scheduled activities and/or events directly to the power allocation control module 30 (and/or power allocation controller 10) by the communication channel 100 (wireless, LAN, through the AC connection, etc.). Alternatively or in combination with other embodiments, the connected devices 102a-102n can provide this information to another device (e.g., control device), which would act as an intermediary with the power allocation control module 30 (and/or power allocation controller 10). In further embodiments, the power allocation control module 30 can poll the devices 102a-102n for current and future activities, priorities and/or rules.

In still other embodiments, the power allocation control module 30 (and/or power allocation controller 10) can determine the amount of power it can supply to the connected devices 102a-102n based on total power consumption in the network 106, total allocated energy costs for a time of day, priority of the devices that need power, and/or time of day usage or other parameters as discussed herein. For example, the power allocation control module 30 (and/or power allocation controller 10) can charge a battery of a device 102n based on a current low battery indication, while placing another device in sleep mode, and allowing another device to have a low battery, since it has been detected as being plugged in but not in use, all based on a total allowed energy consumption usage for the network 106. In this way, the power allocation control module 30 (and/or power allocation controller 10) can control and/or manage which devices receive power, and for what period of time in order to manage the power consumption of the entire network 106.

The power allocation controller 10 can be implemented on a computing device 14 which includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The computing device 14 is in communication with the external I/O device/resource 28 and the storage system (database) 22B.

In general, the processor 20 executes computer program code, which can be stored in the memory 22A and/or storage system 22B. The power allocation control module 30 can be implemented as one or more program code stored in memory 22A as separate or combined modules. Additionally, the power allocation control module 30 may be implemented as separate dedicated processor to provide the function of this tool. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
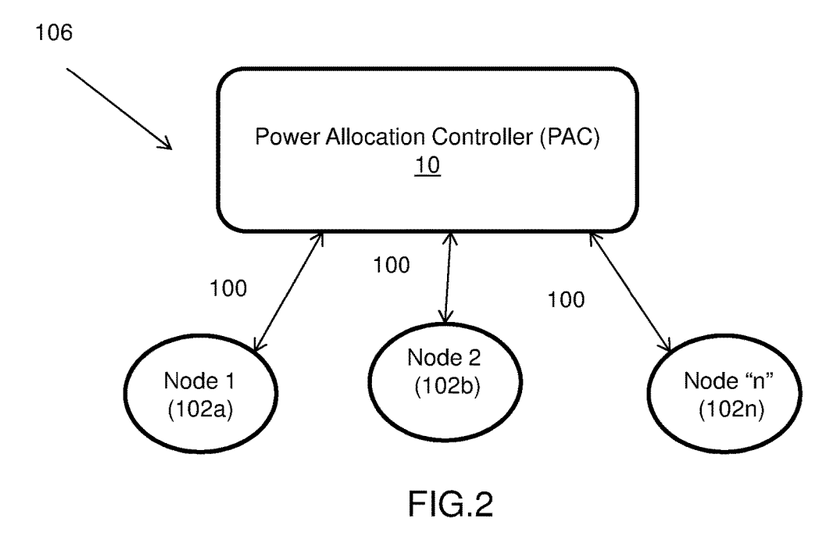
FIG. 2 shows a network in accordance with aspects of the invention.

FIG. 2 shows an exemplary network 106 in accordance with aspects of the invention. More specifically, the network 106 includes devices 102a-102n and the power allocation controller 10. In embodiments, the network 106 is a collection of devices 102a, 102b, 102n in a physical location such as, for example, an enterprise, a building, floor, campus, etc. The network 106 includes the power allocation controller 10, which communicates with the devices 102a, 102b, 102n by way of e.g., LAN communications software, Ethernet or other communications link 100 as described above. In embodiments, the devices 102a, 102b, 102n can be connected to a single charging brick or station operating in a client fashion in the network 106.

In embodiments, the power allocation controller 10 maintains the network 106, which may be grouped devices (as previously described). The network 106 will communicate with the devices 102a, 102b, 102n via a charging station or individually. In embodiments, the network 106 knows each device on the network 106, which can be provided by a polling mechanism, or the devices actively providing their location and other information to the power allocation controller 10 through the network 106. In this way, the power allocation controller 10 will know, for example, which devices are on the network 106, charging power budget for each device or group of devices, and other information such as scheduled events and/or activities, charging priority, current and/or historic usage, type of device and hardware and/or software configuration, etc.

With some combination of this information, the power allocation controller 10 can, for example amongst other features, alone or in any combination:

Provide power to a device based on events and/or activities scheduled in its electronic calendar. In embodiments, the power allocation controller 10 can obtain information from any of the user's device, and manage the power of any of the user's devices. So, the power allocation controller 10 can obtain information from a calendar of one device and provide actions (power management) to other devices.

Power balancing delivered power to not exceed client charging station requirements.

Power limiting of devices within the network to not exceed mobile device charging characteristics.

Priority charging scheduling based on type of device (e.g., heart monitor vs. gaming console), user of device (e.g., doctor vs. casual user of device), dedicated services of the device (medical vs. gaming), etc.

Power balancing based on "Environmentally Friendly Policy" set for power usage of a certain site, building, room, group of devices, etc.

In further embodiments, the devices 102a, 102b, 102c can report their physical location and a unique ID to the power allocation controller 10. The physical location of the devices can be provided by RF signaling, GPS methodologies or known triangulation methods, for example. The physical location can be used to determine the location and hence used for management of the devices on separate or same networks. The ID may be an Ethernet MAC address or unique ID reported by the devices, e.g., smart battery, or a combination of these and other identification factors as described herein. In further embodiments, an AC charger (e.g., brick) or client charger can incorporate a unique ID code which is also transmitted to the power allocation controller 10 by various communication mechanisms as described herein.

Figure 3:
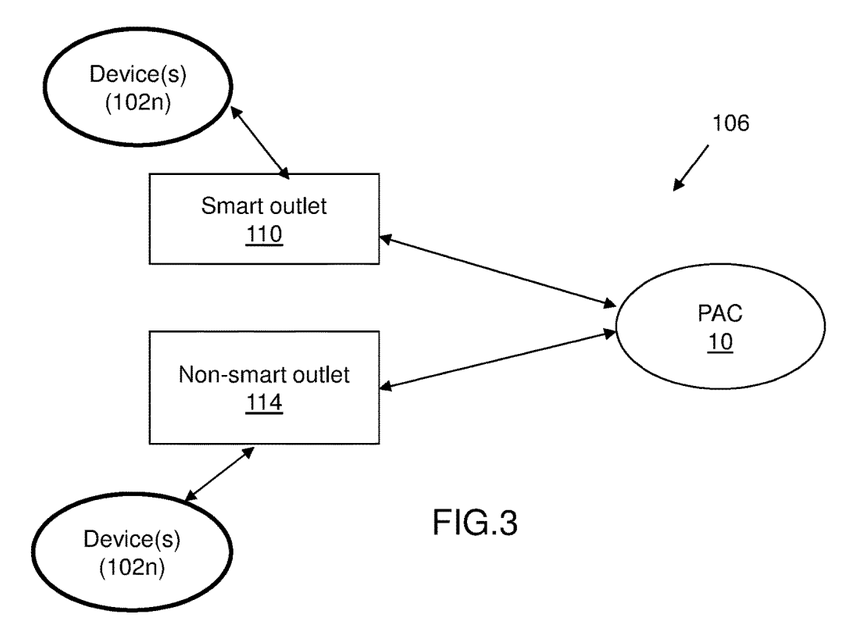
FIG. 3 shows another network in accordance with aspects of the invention.

FIG. 3 shows an exemplary network 106 in accordance with aspects of the invention. In this embodiment, the power allocation controller 10 is connected in the network 106 to a smart outlet 110. The smart outlet 110 and the non-smart outlet 114 (e.g., an outlet that does not include control logic) can be connected to one or more devices 102n. The smart outlet 110 and the non-smart outlet 114 provide power to the devices 102n, which may be managed by the power allocation controller 10. In embodiments, the smart outlet 110 can be a smart charger, for example.

In embodiments, the smart outlet 110 can provide device information to the power allocation controller 10 through a wire or wireless communication link. More specifically, in embodiments, the devices can communicate with the smart outlet 110, and/or directly with the power allocation controller 10 via a communication link which may be, for example, a LAN or even an AC signaling modulation over an AC/DC power line. In turn, the power allocation controller 10 can provide instructions for power management to the smart outlet 110 for managing and/or balancing power consumption by each of the devices based on the above noted criteria or any combination thereof.

More specifically, in embodiments, the smart outlet 110 includes logic that is configured to distribute and/or manage power to devices. The smart outlet 110, in embodiments, can optionally act as a network switch and provide network connectivity between the devices 102n and the power allocation controller 10. For example, the logic of the smart outlet 110 can be programmed with the amount of power and/or other requirements for power management for each device 102n connected to the smart outlet 110 based on, for example, priority and calendar events and/or activities. As noted above, this is possible by receiving calendar events/activities, location and/or ID information from the devices 102n.

Accordingly, in an illustrative example, the smart outlet 110 can act as an intermediary between the devices 102n and the power allocation controller 10. For example, the devices 102n can communicate their scheduled events and/or activities, power requirements, priorities, ID information, set up configurations and other information to the smart outlet 110 (in addition to or alternatively to the information described herein). In turn, the smart outlet 110 can provide this information to the power allocation controller 10. The power allocation controller 10 can then manage the power consumption of the devices based on the information provided.

In an alternative or additional embodiments, the smart outlet 110 can include logic that is equivalent to, or supplements, that of the power allocation controller 10. In this way, the smart outlet 110 can manage the power to each of the devices connected thereto, in a local network. In this way, the smart outlet 110 can place devices in sleep mode or other lower power consumption mode, as well as determine power delivery to each of the devices based on any of the above noted criteria, as provided by the power allocation controller 10. In embodiments, the smart outlet 110 (and/or non-smart outlet 114) can be programmed by or receive instructions from the power allocation controller 10 with the power management information for each of the devices, e.g., how much power each device may consume for a certain period of time.

Figure 4:
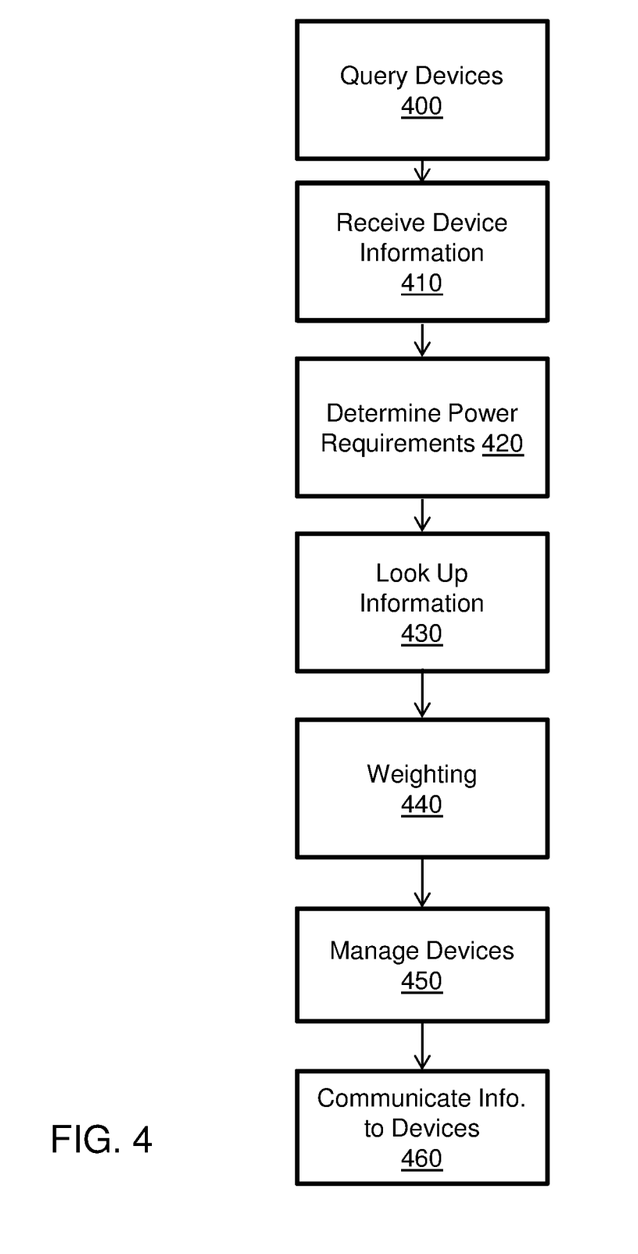
FIG. 4 shows a flow diagram implementing processes in accordance with aspects of the invention.

FIG. 4 shows an exemplary flow for performing aspects of the present invention. The steps of FIG. 4 may be implemented in the environment of FIG. 1, for example. The flow diagram may equally represent a high-level block diagram or a swim-lane diagram of the invention. The flowchart and/or block diagram in FIG. 4 (and any other flowcharts and/or block diagrams) illustrates the architecture, functionality, and operation of possible implementations of systems, methods and computer program products according to various embodiments of the present invention. In this regard, each block in any of the flowcharts, block diagrams or swim-lane diagrams may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustration can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any users of portable computing devices, etc. In return, the service provider can receive payment from the customer(s) under a subscription and/or fee agreement and/or the service provider can receive payment from the sale of advertising content to one or more third parties.

FIG. 4 shows a flow for managing power consumption based on the devices connected to the power allocation controller, in accordance with aspects of the invention. It should be understood that the management of the power consumption may also be performed by the smart outlet, with or without instructions from the power allocation controller. In the latter case, the logic of the smart outlet can be the same as the power allocation controller, but implemented on a local level (local network). Accordingly, although FIG. 4 is discussed with reference to the power allocation controller, one of skill in the art should understand that the processes described herein are equally applicable to the other components herein.

More specifically, at step 400, the power allocation controller queries the devices for calendar information. In embodiments, the devices can be polled periodically for the calendar information, in addition to other rules and/or priorities. In other implementations, the devices can proactively provide (e.g., push) the calendar information, rules and/or priorities to the power allocation controller.

At step 410, the power allocation controller receives information from the devices. This information can be, for example, any of the above rules, priorities and/or calendar events/activities. The information can also include, for example, battery type and/or charge, device configuration, etc., connection to other devices, computational needs, etc. as described herein In embodiments, the devices can also provide location information via GPS, RF and/or triangulation methods.

At step 420, the power allocation controller, once the information is received, uses the calendar events/activities to determine which devices require battery charging and/or other power needs, based on the current and future calendar events/activities. In embodiments, the calendar events/activities can be received from one device of the user, and management of power can be implemented on another device of the user. For example, a portable device such as a smart phone may provide calendar events/activities (which may be synchronized with other devices) for each of the user's devices.

Additionally, at step 430, the power allocation controller can look up the power consumption requirements of the device in a look up table, based on the calendar events/activities, prioritization and rules. At step 440, the power allocation may place a weight for the rules and/or priorities and/or calendar events/activities based on preconfigured weighting factors. For example, a device that is going to be used for a revenue generating meeting may be provided with a higher weight factor for battery charging, than a device that is being used for email that has available power supply and is not being used for any presentation. On the other hand, a device that is being used for a presentation in a meeting may be provided with a higher weighting for power consumption (e.g., will not have any of its components turned off) than a smart phone that is not currently in use. Weighting factors may also be provided based on current time of day, power allocation for the entire enterprise and other situations. For example, in the case in which the time of day is peak energy use (e.g., highest cost), then only essential devices may be charged. By way of illustration and non-limiting example, essential devices may be weighted higher than other devices to ensure that they are always charged and/or receive power. These essential devices may be medical devices, emergency response devices, security devices, laptops that are required for revenue generating meetings, smart phones of top salespersons, etc.

In this way, the embodiments of the present invention can be rules driven and customizable by each implementation. This allows the service provider, management, etc. to define a weight factor to allow the system to intelligently calculate how power is delivered, and allow the system to allocate/ reallocate power resources as the environment changes, e.g., new users, power grid supply, power pricing, etc.

At step 450, the power allocation controller adjusts power consumption based on the received information. In embodiments, the power consumption may also be adjusted based on total allotted power consumption for a particular network and/or total allotted costs allowed for power consumption for a particular (or plural) power delivery networks.

Based on this information, the power allocation controller can manage the power consumption of each of the devices, at step 450. For example, depending on the time of day and cost of the electricity, scheduled calendar events/activities, rules and/or priorities (whether weighted or not) the power allocation controller may perform, as illustrative examples, the following operations/functions/instructions/determinations:

- Charge batteries when peak usage and hence costs are at their lowest;
- Place a device in sleep mode when the device is not being used and when there is peak usage on the grid and hence costs are at their highest;
- Do not charge any batteries, unless they are on a priority, e.g., medical devices, security devices, etc. at peak usage times, or an upcoming scheduled event has a priority and requires a charged device;
- Minimize power consumption of devices when there is peak usage on the grid and hence costs are at their highest;
- Run only those devices that are absolutely necessary, e.g., medical devices, security devices, based on their priorities and upcoming scheduled event, when there is peak usage on the grid and hence costs are at their highest;
- Charge batteries when there is not going to be any available power supply and an upcoming scheduled event requires device use; and/or
- Ensure that a total power consumption of the devices in the network do not exceed a predetermined voltage requirement.

At step 460, the power allocation controller provides an indication to the user of the decision (and other information such as, for example, priority) to charge the device or provide some other power management information.

Accordingly, the power allocation controller provides power for multiple computing devices, by receiving information about these devices and current and upcoming scheduled activities over a data network to reference all present and future actions, and/or other priority factors to determine the priority in receiving levels of power delivery. Priority factors are assimilated and scalable across the enterprise or down to an individual room or small group of power delivery ports. In this way, the power allocation controller determines the current and near-term future power needs for each connected device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method of managing power consumption of a plurality of devices, comprising:
   receiving scheduled upcoming calendar events and/or activities from an electronic calendar of one or more of a plurality of devices connected in a network;
   centrally managing power consumption and priority charging assignments of a device of the plurality of devices in the network based on the scheduled upcoming calendar events and/or activities;
   updating and storing the electronic calendar in the one or more of the plurality of devices with power availability of one or more power appliances at a location of the one or more of the plurality of devices when the one or more power appliances are available at the location of the one or more of the plurality of devices; and
   rescheduling the scheduled upcoming calendar events and/or activities to another location that meets predetermined power requirements in response to the predetermined power requirements exceeding the power availability of the one or more power appliances at the location of the one or more of the plurality of devices.

2. The method of claim 1, wherein:
   the scheduled upcoming calendar events and/or activities are received by a central power allocation controller that has logic for managing the power consumption of the one or more devices; and
   the network includes any combination of devices within a certain location.

3. The method of claim 1, wherein the managing comprises remote power management of the one or more devices within the network which comprises ensuring that devices are charged based on rules associated with the scheduled upcoming calendar events and/or activities.

4. The method of claim 3, wherein the managing comprises power allocation based on the priority assigned to the one or more devices or scheduled upcoming calendar events and/or activities.

5. The method of claim 4, wherein at least one of the rules and priority are assigned a weighting factor, wherein the higher weighting factor gives preferences for charging essential devices of the one or more devices, compared to a lower weighting factor.

6. The method of claim 1, wherein the scheduled upcoming calendar events and/or activities are polled periodically by a centralized power allocation controller to determine power supply and charging of a battery.

7. The method of claim 1, further comprising receiving additional device information from the one or more devices, which includes BIOS information, user information, location information, computer configuration information, registry information, hardware configuration information, and software configuration information.

8. The method of claim 1, wherein the managing comprises looking up in a look up table charging rules associated with the calendar events and/or activities and applying the charging rules to the one or more devices.

9. The method of claim 8, wherein the look up table includes received information from a power grid, which includes peak power usages and energy costs for certain times of the day, and the managing includes charging the one or more devices based on the information received from the power grid.

10. The method of claim 1, further comprising notifying the device of charging capabilities associated with the scheduled upcoming calendar events and/or activities.

11. The method of claim 1, further comprising notifying the device of actions to be taken for power management based on at least one of the scheduled upcoming calendar events and/or activities, rules and priorities.

12. The method of claim 1, wherein the receiving is provided from a first device and the managing is performed on a second device, different from the first device.

13. The method of claim 1, wherein the managing the priority charging assignments comprises charging the one or more devices based on a priority assigned to the one or more devices or scheduled events and based on upcoming calendar events and/or activities, wherein one or more devices with a higher priority is charged prior to one or more devices with a lower priority.

14. The method of claim 1, wherein the managing the power consumption comprises allocating power based on a location of the device, wherein device components are turned off based on the location of the device.

15. The method of claim 1, wherein the managing the power consumption comprises diverting power to critical systems when a power failure or reduction in available power occurs.

16. The method of claim 1, further comprising placing the one or more devices in sleep mode when the one or more devices is not being used and when there is peak energy usage costs during a time of day on a grid.

17. The method of claim 16, further comprising minimizing power consumption of the one or more devices when there is peak energy usage costs during the time of day on the grid.

18. The method of claim 1, wherein a total power consumption of the one or more devices in a network do not exceed a predetermined voltage requirement corresponding to a predetermined total power consumption.

19. The method of claim 1, further comprising charging batteries of the one or more of the plurality of devices in response to power usage being at a lowest point.

20. The method of claim 19, further comprising receiving a priority charge request from the one or more of the plurality of devices to fully charge the one or more of the plurality of devices based on an upcoming travel plan.

* * * * *